March 23, 1954   L. PEARMAN ET AL   2,672,901
PEANUT SHELLER HAVING A PARTIAL SHELLING CYLINDER
Filed Nov. 5, 1948   8 Sheets-Sheet 1

INVENTORS
LAWRENCE PEARMAN
FRED PEARMAN
BY
Jerome W. Paxton
Agent.

March 23, 1954  L. PEARMAN ET AL  2,672,901
PEANUT SHELLER HAVING A PARTIAL SHELLING CYLINDER
Filed Nov. 5, 1948  8 Sheets-Sheet 3

INVENTORS.
LAWRENCE PEARMAN
FRED PEARMAN
BY
Jerome W. Paxton
Agent.

March 23, 1954   L. PEARMAN ET AL   2,672,901
PEANUT SHELLER HAVING A PARTIAL SHELLING CYLINDER
Filed Nov. 5, 1948   8 Sheets-Sheet 5

INVENTORS.
LAWRENCE PEARMAN
FRED PEARMAN
BY
Agent.

March 23, 1954     L. PEARMAN ET AL     2,672,901
PEANUT SHELLER HAVING A PARTIAL SHELLING CYLINDER
Filed Nov. 5, 1948     8 Sheets-Sheet 7

Inventors
LAWRENCE PEARMAN
FRED PEARMAN

Agent.

UNITED STATES PATENT OFFICE 2,672,901

PEANUT SHELLER HAVING A PARTIAL SHELLING CYLINDER

Lawrence Pearman and Fred Pearman, Chula, Ga.

Application November 5, 1948, Serial No. 58,398

8 Claims. (Cl. 146—11)

The present invention relates to methods and machines for shelling nuts, and more particularly relates to peanut shelling methods and machines so designed as to increase production and at the same time lower materially the number of splits produced during the shelling cycle.

The peanut shelling machines currently employed are objectionable in several regards. Perhaps one of the primary objections is that the machines shell the largest percentage of the peanuts immediately after their entrance into the opening, and therefore the remaining portion of the grates shells little or no peanuts. It is believed that this may be attributed to the manner in which the peanuts feed into the shelling area, since they feed only around the outside of the revolving cylinder or rotor and the beater bars. Most of the prior machines employ a wide beater bar which tends to crush the hulls, thereby splitting a great percentage of the kernels which thus provides a nut of lower grade. Certain of the machines use a few relatively narrow bars which, of course, lowers the shelling capacity. If either a narrow bar or too many bars are employed, it can be seen that there will be afforded the same effect as too wide a bar. Too many bars, even though they are narrow, function in the same manner as a solid cylinder.

In the prior machines, even in cases wherein narrow bars are provided, the products are only shelled over the same portion of the grates as is the case with the wide beater bars namely the point of entrance of the nuts into the machine. With the type of beater bars currently used, it is not possible to control the correct amount of feed to the machine. If too many peanuts are admitted, there is a tendency for them to pack and break the kernels in the shelling area. On the other hand, if too few peanuts are admitted, the kernels will be split, due to the relatively great impact from the beater bars. Furthermore, the distance between the beater bar and the grate is constant, regardless of the variety of peanuts being shelled.

Moreover, these prior machines achieve the desired end by crushing or abrading the hulls against each other or against round shoulders or dull humps on the shelling grates.

We have ascertained through considerable experimentation that if the shelling grates and beater bars are formed with a sharp, smooth cutting edge, the hulls will be cut away from the kernels, thereby enabling the kernel to free itself more readily and allow the kernel to escape from the machine in a much shorter period of time. Manifestly, this arrangement is particularly efficacious, in that the period of time to which the kernel is subject to possible injury or damage is materially shortened and, in addition, the sharp cutting edge will increase production well beyond that of the types of shelling machines now employed.

Also, we have found that different varieties of peanuts require a different distance between the beater bars and grates. If the same distance is used for different varieties, it results in too many of the large variety being split, by not having sufficient distance between the beater bars and grate, while in the small variety the production is lowered too much by having too great a distance between the beater bars and the grate.

While the general construction of our shelling machine is similar to machines now in use, the salient features reside in the revolving partial cylinder and in the shelling grate. One of the important features is that the revolving partial cylinder or rotor is provided with beater bars so constructed as to permit the peanuts to feed from the inside out over the entire surface of the shelling grate. Another feature is that the beater bars and grates are formed with a sharp cutting edge which cuts away the hulls rather than removing the hulls entirely by an abrading process. Furthermore, the grate is so designed that the entire surface area thereof may be employed as a shelling surface, and the grate is also provided with an opening having more taper, thus permitting the shelled nuts to escape more readily and easily.

An important object of the present invention is to provide a nut shelling machine wherein the shelling grate is so mounted in the machine casing that it may be quickly and easily removed for the purpose of providing different size slots between the grate bars, and, in addition enables the changing of the distance between the beater bars and grates for accommodating different varieties of nuts.

Yet another object of the present invention is to provide a novel shelling grate for nut shelling machines wherein the entire surface of the grate constitutes the shelling area.

Yet a further object of the present invention is to provide a shelling grate of the type described wherein the grate bars are held in a rigid manner by novel connecting means.

Still another object of our invention is to provide grate bars for peanut shelling machines provided with a cutting edge in the shelling zone for removing the hulls.

Still another object of our invention is to provide a grate so designed that when the grate is changed to accommodate different varieties of peanuts, the distance between the beater bars and grate is changed to the correct distance for the variety of peanut being shelled.

A further object of this invention is to provide a method of removing hulls from peanuts wherein the peanuts are fed from inside the rotating partial cylinder into contact with sharpened beater and grate bars, thereby increasing materially the volume of nuts that can be processed.

And yet another object of our invention is to provide a partial cylinder or rotor with inside feed which cooperates with the shelling grate in such a manner that the beater bars carried thereby each has the same peripheral travel and each beater bar is of the same length.

A further object is to provide a partial cylinder or rotor with inside feed for peanut shelling machines wherein the beater bars all have the same peripheral travel, but certain of the bars are of less length than other of the bars.

Another object of this invention is to provide a partial rotor with inside feed of the character set forth wherein the beater bars are arranged in groups in such a manner that each bar in each group has a different peripheral travel, but are of the same length.

A further object of our invention is to provide a peanut shelling machine of the character described with a partial cylinder or rotor with inside feed wherein the beater bars are arranged in groups with each bar in each group having a different peripheral travel and with certain of the bars being of lesser length than other of the bars.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which.

Figure 1:
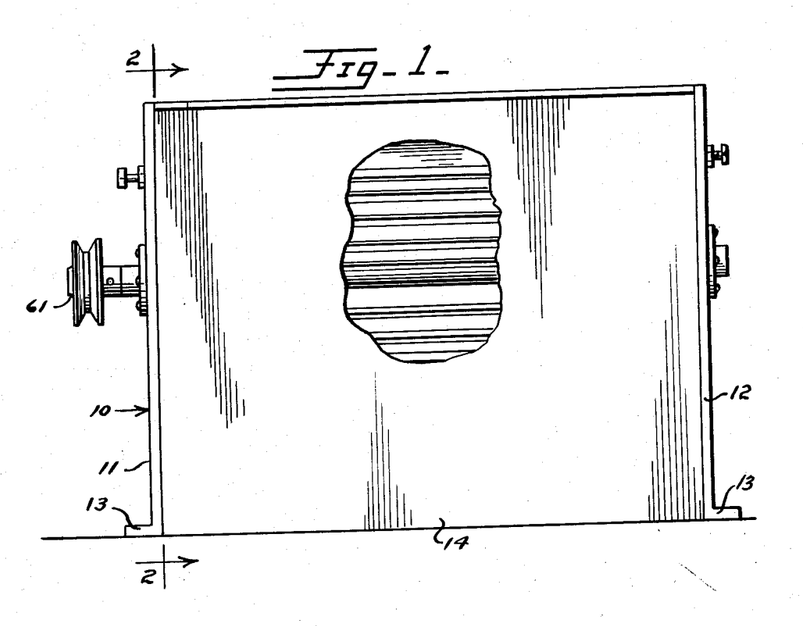
Figure 1 is a side elevational view, partly broken away, of a peanut shelling machine embodying our invention.

Referring to Figure 1, it will be noted that the numeral 10 designates the shelling machine generally and it comprises end castings 11 and 12, the lower ends of which are formed with flanges 13 so that the machine may be bolted or otherwise secured to a suitable supporting surface. Side plates 14 are attached to the end castings 11 and 12, and these plates extend from the upper margins of the castings to the lower margins thereof and preferably inclined inwardly, as shown at 15, thus providing a hopper between, as is, of course, well known in the prior art. Located within the machine 10 and extending longitudinally thereof is a shelling grate, designated generally 16. A partial cylinder or rotor 17 is located within and concentric with the grate 16, and the rotor is journalled in the end castings 11 and 12.

A metal plate 18 is hinged to each of the side plates 14 adjacent the open upper end of the machine, as shown at 19. A second metal plate 20 is pivotally mounted to the lower face of the plate 18 adjacent the forward edge thereof, as indicated at 21, and terminates in a downwardly extending member 22. A spring 23 has one end secured to the plate 18 and the opposite end anchored to the side plate 14 of the machine for urging the plates 18 and 20 downwardly in such a manner that the extending member 22 will bear against the grate 16 for providing an entrance mouth for admitting the nuts into the shelling machine, as will hereinafter be more fully described. A handle (not shown) is attached to the upper face of each plate 18 for enabling the plates to be moved upwardly about the hinges 19, thus enabling easy access to be had to the interior of the machine.

Figure 5:
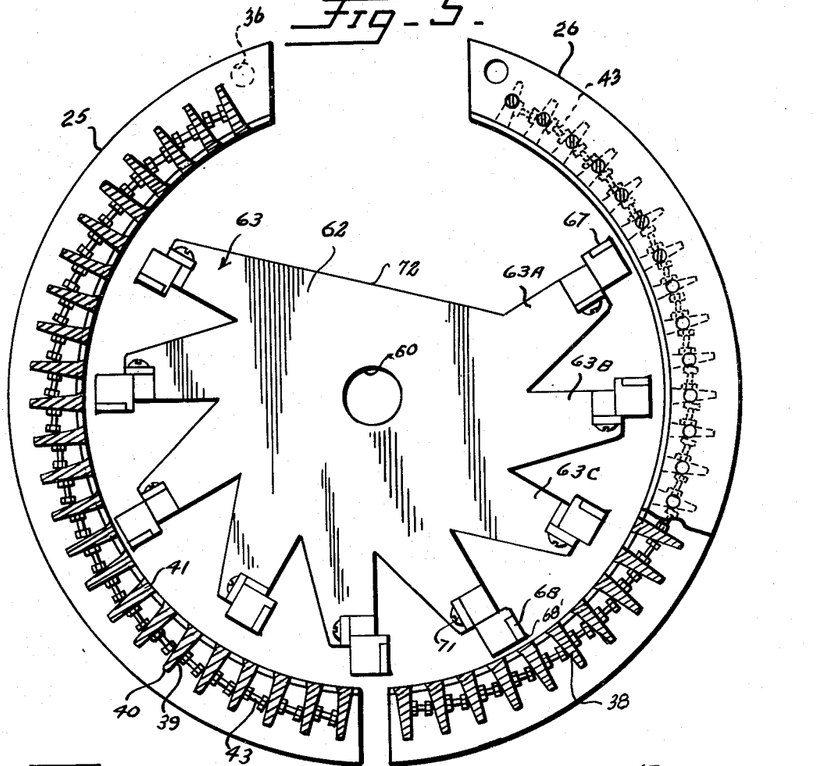
Figure 5 is a view in side elevation, and partly in section, of the shelling grate and one of the supporting spiders of the rotor wherein the beater bars carried by the rotor are arranged in groups with the individual bars of each group having a different peripheral travel.
Figures 8, 15:
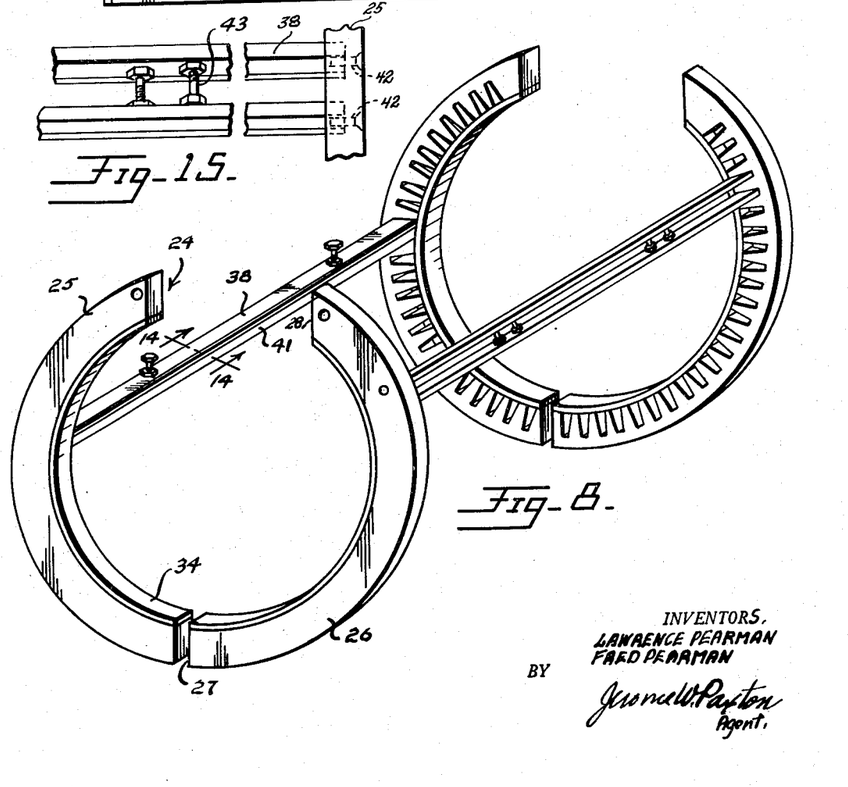
Figure 8 is a view in perspective of the shelling grate, showing the manner in which the individual grate bars are supported by the annular members detachably connected to the end castings of the machine.
Figure 15 is a fragmental detail view showing the spacer assembly for the individual bars of the shelling grate.

As above pointed out, the important details of our invention are directed to the shelling grate and rotor assemblies. The grate comprises an annular-like supporting member for the grate bars and there is one annular-like member 24 for each end casting of the machine. Since the structural details of each member 24 are identical, the description will be limited to but a single member. Each end casting has two supporting rings welded, cast integral, brazed or otherwise secured to the inner face of the casting, and the outer diameter of the inner supporting ring is equal to the inner diameter of the annular-like member 24. The inside diameter of the outer supporting ring, which is semi-circular or less, is equal to the outer diameter of the annular-like member 24. The member 24 comprises a pair of arcuate segments 25 and 26 and, as shown in Figures 5 and 8, the lower ends of the segments 25 and 26 are in abutting relationship, as designated by the numeral 27. The upper ends of the segments 25 and 26 are spaced apart and the walls thereof have the same angle as the extending member 22 provided on the metal plate 20, as is perhaps best shown in Fig. 2. When the respective arcuate segments are located on the supporting rings in proper position, we have ascertained that the opening from the point A to the point B should be five inches and that the inside diameter of the grate should be thirteen inches. While these specific dimensions have been found the most practical under operating conditions, it is, of course, to be understood that, should the conditions warrant, other dimensions may be employed.

Figures 4, 9, 10, 14:
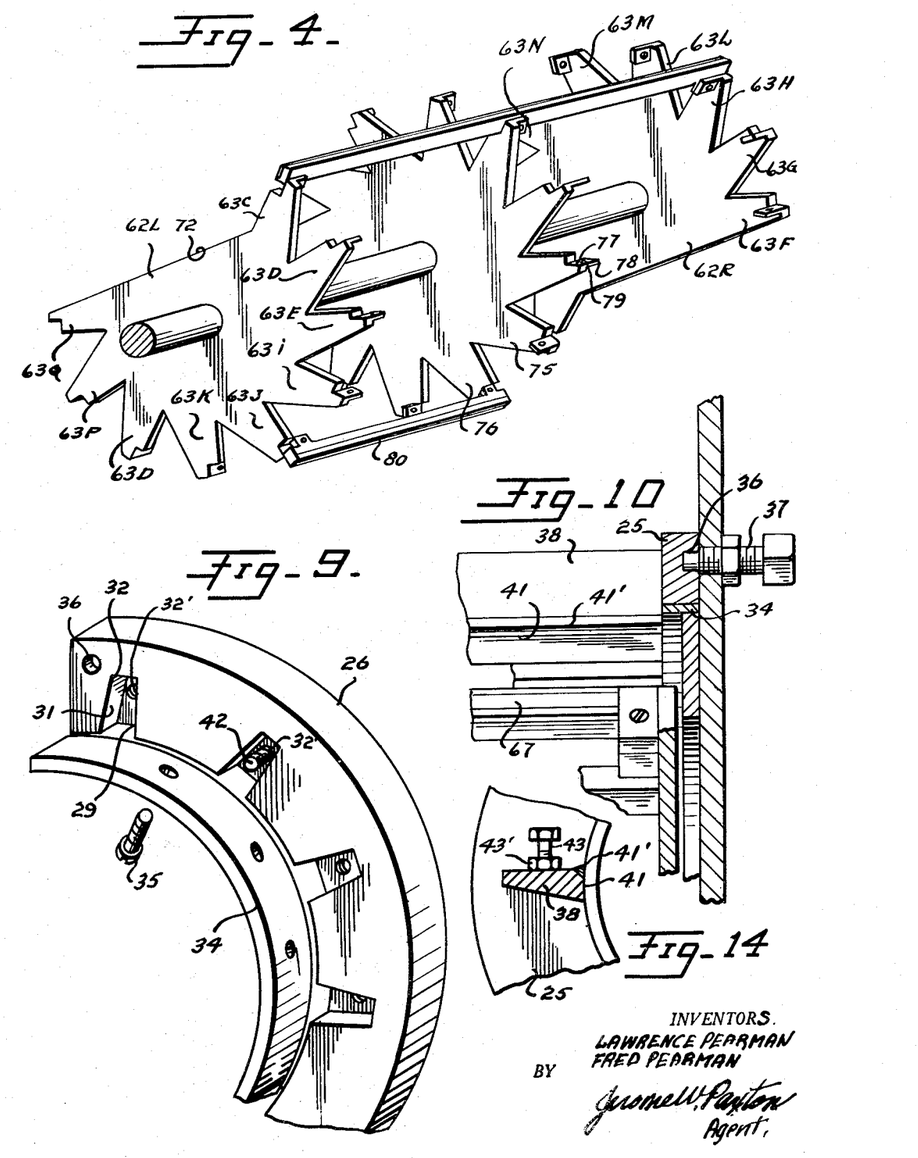
Figure 4 is a perspective view of one form of a partial cylinder or rotor wherein beater bars of different lengths are employed and are so disposed as to have inlet openings adjacent each end of the rotor, the openings being located 180 degrees with respect to each other.
Figure 9 is an exploded view of the members constituting the annular supporting members for the shelling grate bars.
Figure 10 is a sectional view taken along the line 10—10 of Figure 2, looking in the direction of the arrows.
Figure 14 is a sectional view taken along the line 14—14 of Figure 8, looking in the direction of the arrows.

Each of the segments 25 and 26 is formed with a plurality of equally spaced recesses 29 having a flat base 30, inwardly inclined side walls 31 which merge with a flat wall 32 and, as shown in Figure 9, the recesses 29 taper inwardly from the inner diameter of the segment toward the outer diameter thereof. An arcuate bearing strip 34, preferably of one piece, is attached by screws or the like 35 to the inner diameter of each of the segments 25 and 26 and the bearing strip 34 is adapted to rest upon the supporting ring secured to the end casting. In order to attach each annular-like member 24 to the end casting, it will be noted that each segment is formed with a circular opening 36 adjacent the edge 28, and a locking bolt assembly 37 is adapted to coact with the circular opening 36 for securing the segment to the end castings at the top. The bottom ends of segments 25 and 26 are held rigid and in place by the supporting rings on the inner face of the end castings as previously described. Obviously, by the proper manipulation of the bolt 37, it is possible to remove the desired segment from the end casting in a minimum of time.

A metal grate bar 38 having inwardly tapering side walls 39 and a flat or planar base 40 is adapted to have its ends thereof seated in the recesses 29. The recesses and bars 38 are so dimensioned that the outer face of the bar is substantially flush with the inner periphery of the annular-like member 24. As perhaps best shown in Figures 5 and 8, the inner or working face of the bar is provided with a concave surface 41 conforming to the circular form of the finished grate and having edge 41' made of a hard abrasion-resisting material. The abrasion-resisting material may be welded or brazed to the body of the bar 38 in order to provide a durable cutting edge for the grate bar, although this cutting edge may, of course, be accomplished by other means.

To secure each bar 38 to the annular-like member 24, a screw or the like 42 extends through an aperture 32' in the base 30 and into a tapped hole in the end of the bar 38. To hold the grate bars rigidly in proper position in the annular-like member 24, it can be seen in Figures 14 and 15 that a bolt 43 is tapped into an aperture in the tapering side wall 39 of an adjacent bar 38 at a point intermediate the concave surface 41 and the flat wall 40, and is provided with lock nut 43'. These nut and bolt assemblies are preferably closer to the flat wall 40 than the concave surface so as not to interfere with the cutting adge of the grate bar. Manifestly, the bolt and nut assemblies will not allow any variation between the individual bars 38, and the entire surface of the grate constitutes a shelling area which is a marked improvement over the prior constructions wherein webs and bars have been employed for holding the grate bars in proper position. While we employ two sets of alined nut and bolt assemblies 43, a greater number may be employed, depending, of course, upon the length of the grate assembly. In any event, the distance between the sets of nut and bolt assemblies 43 should be great enough to prevent the arrangement from interfering with the movement of the kernels between the bars.

By having the shelling grate constructed in the manner described, it will be appreciated that the entire grate may be easily removed from the machine by simply removing the four bolt assemblies 37. With this construction, it is possible to readily change the grate from one having large slots between shelling bars 38 to a grate having smaller slots, thereby enabling the machine to accommodate the different varieties of nuts which are different in size. In order to accomplish this end, we obtain the slots of varying size by having the concave surface 41 of varying length. The construction of the grate also enables us to have the correct distance between grate 16 and rotor 17 for the size peanut being shelled. This part of the construction of the grate is described in a later paragraph describing Figure 23. The advantage of these features will be readily apparent to those skilled in the art.

To obtain the maximum efficient results, the grate assembly includes forty-eight grate bars, although, under certain conditions, a more or less number of bars may be employed.

The individual grate bars may be easily removed and replaced in case of accidental damage to the bars. This is done by removing the particular grate half from the machine and then removing the screws 35 whereby the bearing strip 34 is freed from the segment. The screws 42 holding the desired bar in the segments are then removed, whereupon the bar can be taken out of the segments and a new bar located therein.

The partial rotor 17 which is located within and concentric to the grate assembly comprises a shaft 60, the ends of which are journalled in the end casting 11 and 12 on ball bearings (not shown). The end of the shaft 60 which projects through the end casting 11 has a pulley 61 detachably connected thereto and a drive belt operatively connected to a source of power is trained around the pulley for imparting rotational movement to the shaft. A plurality of spiders 62 are attached to the shaft and, under most conditions, we have found that three spiders are desirable for efficient operation. A spider is located adjacent each end of the shaft and a third is secured intermediate the end spiders. Extending outwardly from the spider are a plurality of arms 63, and it can be seen that there are nine such arms approximately 30 degrees apart. Each arm 63 is cut away to form a seat 64 and the vertical wall of the cut away portion is extended at right angles to the arm, providing a lug 65 having an aperture 66. The arms 63 and their associated elements constitute the supporting surface for a beater or rotor bar designated 67. The bar 67 is formed of square stock metal and the face of the bar which is subjected to the greatest wear has welded or otherwise secured thereto an extremely hard highly resistant substance indicated 68. Extending downwardly from the bar 67 are legs 69 (there being one leg for each spider) provided with an opening 70. In the embodiment shown in Figure 6, the bar 67 is of such length as to extend between the two outer spiders 62, or, in other words, extend the entire length of the cylinder or rotor. The aperture 70 in each leg 69 is alined with the aperture 66 in the arm 63, and a nut and bolt assembly 71 is employed to secure the bar 67 to the spiders. Hence, it can be seen that when a bar 67 is attached to each of the supporting arms 63, the beater bars extend around a substantial distance of the outer circumference of the cylinder. That portion of the spiders not provided with supporting arms 63 and not carrying bars 67 and identified by the numeral 72 provides the entrance, so to speak, through which the peanuts are admitted into the interior of the partial rotor.

Through experimentation it has been determined that the partial rotor 17 should rotate at a relatively high rate of speed, approximately 300 revolutions per minute or higher, and the distance between the beater bars 67 and the concave surface 41 of the grate bars should be such as to enable the peanuts to feed from inside the partial cylinder out through the space between the beater bars 67 and into the shelling area between partial rotor assembly 17 and grate 16 without too much pressure being exerted upon the nuts, thereby keeping the broken kernels to a minimum.

Figure 11:
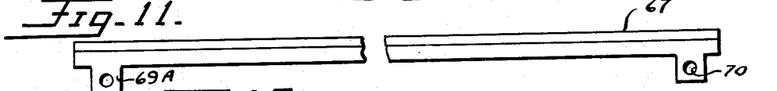
Figure 11 is an elevational view, partly broken away, of one of the rotor or beater bars which is attached to the spiders of the rotor, wherein the individual bars of each group have a different peripheral travel, this bar being the first bar of the group.
Figures 12, 13:
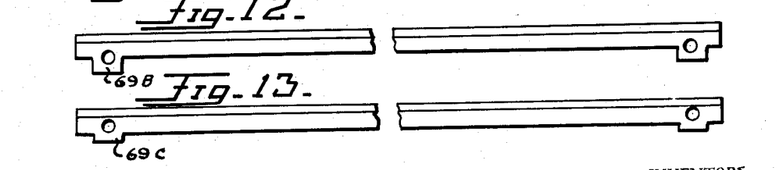
Figure 12 is a view similar to Figure 11, showing the next succeeding bar of the group.
Figure 13 is a view similar to Figures 11 and 12, illustrating the last bar of each group.

In situations where it is desired to have high production with no objection to split kernels such as shelling for the purpose of oil and where hard to shell nuts have previously gone through the machine and are unshelled, which type of nuts is commonly referred to as "tailings," we find that a modification of the partial rotor assembly 17 is desirable. This construction is perhaps best illustrated in Figure 5, wherein the rotor bars 67 are mounted in groups to the arms 63 and a bar of each group has a different peripheral travel from the other bars of the same group. To accomplish this purpose, and attention is called to Figures 11 to 13, inclusive, it will be noted that the bar 67 secured to arm 63A is provided with relatively long legs 69A. This means that when the bar 67 is secured to the arm 63A, the bar will be relatively close to concave surface 41 of each of the shelling bars 38. The leg 69B of the bar 67 which is attached to the following supporting arm 63B is of lesser length than the leg 69A, thereby providing a greater distance between the bar 67 and the concave surface of the grate bar. Finally, the leg 69C of the bar 67 which is secured to the arm 63C of the spider is of considerably less height than the legs 69A and 69B, thereby providing a larger gap between the bar 67 and the concave faces of the grate bars. Since the beater bars of the remaining groups are secured in a similar fashion, it is not deemed necessary to elaborate further. Hence, it will be observed that the first bar of each group, namely the bar carried by the arm 63A has a greater peripheral travel than the following bar and each succeeding bar has a lesser peripheral travel until the final bar of the group is reached. With this arrangement, by having the first bar of each group located at a greater distance from the shaft 60, it allowed more peanuts to be admitted into the opening of the partial cylinder as it passes the inlet of the machine. The next bar in the group being somewhat closer to the shaft 60 will allow the nuts to more rapidly feed out between the rotor bars toward the bars of the shelling grate, and as more nuts are fed out between the bars into the area between the cylinder and the shelling grate, the pressure is increased upon the peanuts which, in turn, will enable the machine to shell them more readily.

As above mentioned, this embodiment is primarily employed in situations where there is no objection to having split kernels.

We have further determined that vibration of the partial cylinder can be eliminated by evenly distributing the weight of the beater bar 67 around the outer periphery of the rotor 17. To accomplish this end, the end spiders 62 are located at different positions relative to each other on the shaft 60, and a spider 75 of different construction is secured to the shaft 60 intermediate the end spiders 62. The spider 75 has twelve supporting arms 76 extending outwardly therefrom and each arm 76 is formed with a cutaway portion 77, providing a seat, and the vertical wall of the cutaway portion projects beyond the arm at right angles to the spider, as shown at 78. The member 78 has an opening 79 for the reception of a nut and bolt assembly 71, by means of which the bars are attached to the arms.

For simplicity in describing the structure of this partial rotor form, the spider at the left end of the machine will be referred to as 62L and the spider at the opposite or right end of the machine as 62R. It will be noted that the angular relation of the spiders 62L and 62R is such that the flat face 72 of the spider 62L is 180 degrees with respect to the face 72 of the spider 62R. A beater bar of a length to span the area between the end spiders is attached to arms 63C, 63D and 63E of the spider 62L and to arms 63F, 63G and 63H of the spider 62R. Of course the intermediate spider 75 is so disposed that the bars 67 will be attached to the supporting arms 76. The next succeeding arms of the spider 62L, namely 63I, 63J, and 63K support the beater bars 80 which are of a length to extend between the spider 62L and the spider 75, and the opposite end of each bar is attached to the respective arms 76 of the intermediate spider 75. Secured to and extending from arms 63L, 63M and 63N of the spider 62R are beater bars 80 which are attached at the opposite end to the three corresponding arms 76 of the intermediate spider 75. Finally, beater bars 67 extend from arms 63O, 63P and 63Q of the spider 62L to the remaining arms 63R, 63S and 63T of the spider 62R and, of course, these bars are attached to the arms 76 of the spider 75.

It can be seen, therefore, that the beater bars 67 and 80 all have the same peripheral travel and that by virtue of the connections between the short beater bars 80 and the respective end spiders and the intermediate spider, we provide inlet openings disposed at opposite ends of the partial cylinder or rotor, and that the openings are located 180 degrees with respect to each other. This arrangement, as above indicated, enables the weight of the beater bars to be distributed evenly around the outer diameter of the rotor whereby elimination of vibration of the rotor is achieved. This construction will allow one-half of the cylinder to fill with the peanuts and then as the cylinder rotates 180 degrees, the other half of the cylinder will be filled which, of course, will evenly balance the weight of the beater bars. This particular arrangement of long beater bars and short beater bars may also be adapted for high production purposes and for use with the type of nuts referred to as "tailings." This adaptation is accomplished by arranging the long beater bars 67 and the short beater bars 80 in groups so that the bar of each group has a different peripheral travel from the other bars of that same group. This construction is shown and described in connection with Figure 5 and it is not thought necessary to either illustrate or describe in detail the embodiment used in connection with a partial rotor assembly as shown in Figure 4.

Figure 2:
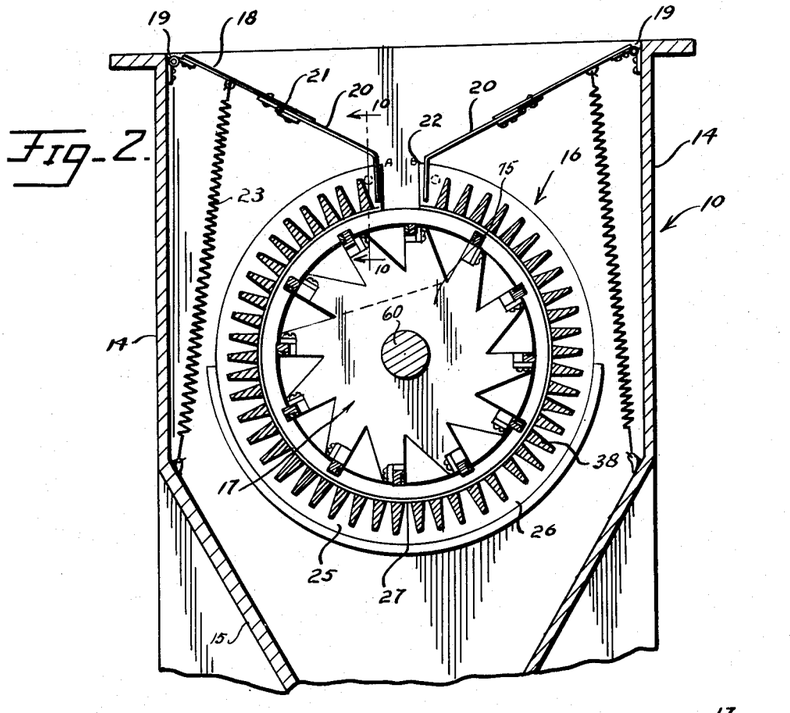
Figure 2 is a sectional view taken along the line 2—2 of Figure 1, looking in the direction of the arrows.
Figure 3:
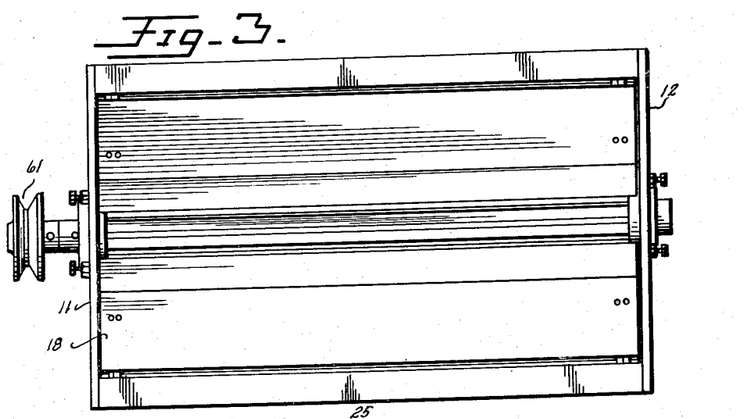
Figure 3 is a top plan view of the machine shown in Figure 1.
Figure 6:
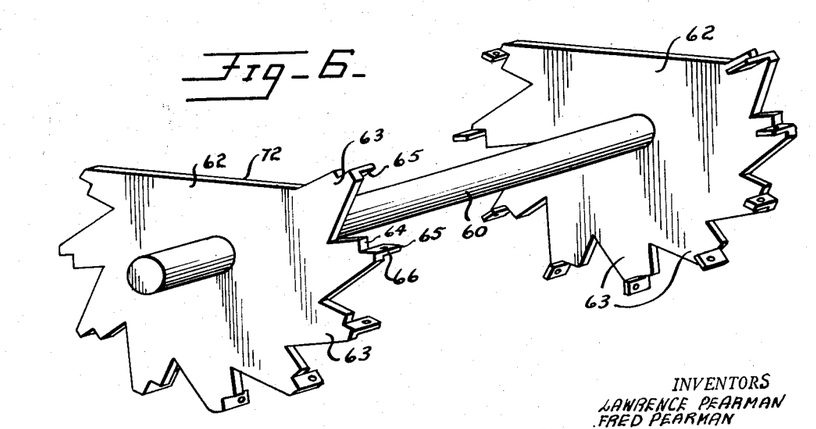
Figure 6 is a view in perspective of another type of a partial rotor wherein the beater bars are of such length as to extend from one end of the rotor to the other end thereof.
Figure 7:
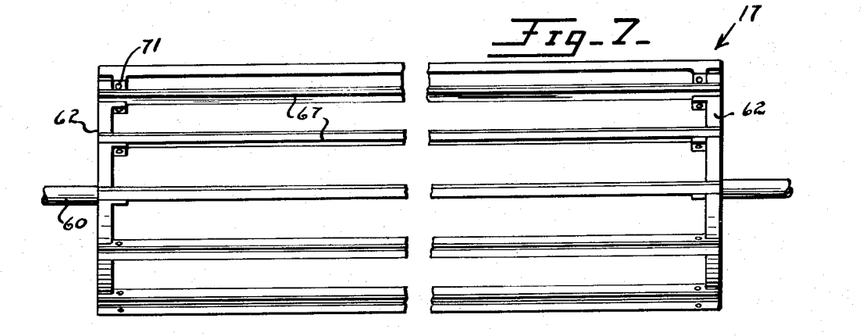
Figure 7 is a top plan view, partly broken away, of a partial rotor such as shown in Figure 6.

When it is desired to operate the machine, the downwardly extending members provided on the lower end metal plates 20 are moved to the position shown in Figure 2 and maintained in such position by the springs 23. The peanuts are fed into the machine through the entrance defined by the downwardly extending members 22 and as the partial rotor 17 rotates (considering the use of the partial rotor shown in Figure 6), the peanuts will enter the rotor as that area thereof not supporting the beater bars 67 passes the entrance. As the rotor continues to rotate, the peanuts will be fed from the inside of the rotor outwardly between bars 67 over the entire surface of the shelling grate 16 which is, of course, defined by the grate bars 38. By virtue of the sharp cutting edges 41' on grate bar 38 and edge 68' on beater bar 67, these bars will cut the hulls away from the kernels, thus allowing the kernels to free themselves more readily and allow the kernels to escape through the slots defined by the adjacent grate bars. Manifestly, this means that the time to which the individual kernels are subject to injury or damage is materially shortened and consequently reduces to a minimum split kernels. Additionally, there is a sufficient space or gap between the outer periphery of the partial cylinder 17 and the inner periphery of the grate 16 to allow the peanuts to feed from inside the partial cylinder or rotor out between the beater bars 67 into the shelling area (between the grate and the rotor beater bars), without too much pressure being exerted upon the nuts, which also tends to reduce greatly the breaking of the kernels. Furthermore, by constructing the grate in the manner shown and described, the entire surface thereof is a shelling area which will increase very materially the shelling of the nuts.

Where it is desired to shell nuts which may be employed for producing peanut oil, we can increase production over that accomplished by the use of the partial rotor shown in Figure 6, by arranging the rotor bars in groups so that the bars of the group will have a different peripheral travel, as shown in Figure 5, and the operation of this form is thought apparent from the foregoing description.

By employing the partial rotor assembly in Figure 4, it is thought obvious that during rotation of the rotor, one half of the rotor will have nuts admitted thereto when the opening at one end of the rotor passes the entrance and that upon rotation of the rotor 180 degrees, the other half of the cylinder will be filled, which allows the weight of the beater bars to be equally distributed around the outer periphery of the rotor, thus eliminating the vibration of the cylinder.

Figure 16:
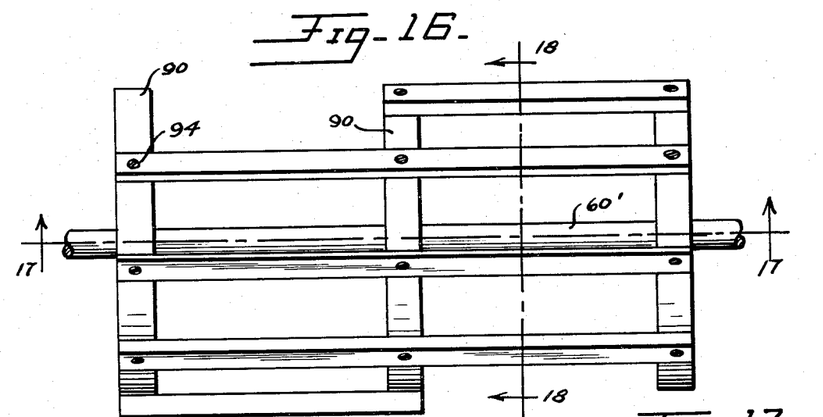
Figure 16 is a view in side elevation of another form of a partial rotor assembly wherein the supporting surfaces for the rotor bars are in the nature of annular members.
Figure 17:
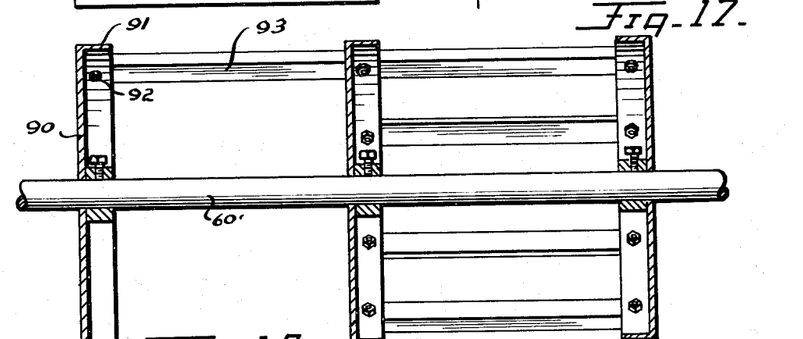
Figure 17 is a sectional view taken along the line 17—17 of Figure 16, looking in the direction of the arrows.
Figure 18:
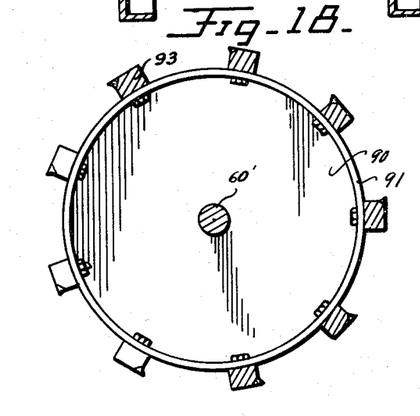
Figure 18 is a sectional view taken along the line 18—18 of Figure 16, looking in the direction of the arrows, viewing the center spider where the rotor has bars of different length.
Figure 19:
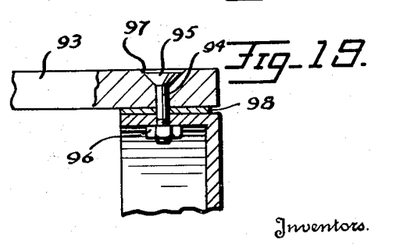
Figure 19 is a detail sectional view showing the manner in which the rotor bars may be secured to the supporting surface whereby the individual bars of a certain group may have a different peripheral travel.

We have illustrated in Figures 16 to 19, inclusive, another type of supporting member for the beater bars of the rotor assembly. In this embodiment, the parts which correspond to the identical elements of the rotor illustrated in Figure 6 will bear the same reference numerals, with the exception that they are primed. A plurality of circular disks 90 are conveniently attached to the shaft 60' at their centers at suitable locations along the shaft, and each disk is provided with an annular flange 91 either formed integral with the disk 90 or attached to the outer periphery thereof in any desirable manner. The flange 91 of the disk is formed with a plurality of equally spaced apertures 92. Rotor bars 93 are adapted to be attached to the supporting disks 90 and, as shown in Figure 16, each rotor bar is formed with a plurality of spaced holes 94, the holes 94 being adapted to be in vertical alinement with the desired apertures 92 in the flanges 91. If the rotor bar extends the entire length of the rotor, there will be three or more such apertures, while if the rotor bar is of a length to extend from one of the outer disks to the intermediate disks, there will be but two or more such holes. When the rotor bar is properly located with respect to the apertures in the disks, a bolt 95 extends through the alined apertures and by drawing up nut 96 it can be seen that the bar will be fastly attached to the supporting disks. Also, each hole 94 is preferably countersunk, as shown at 97, so that the head of the bolt will lie below the upper face of the bar 93. This arrangement is very simple and it is thought clear that the beater bars may be readily secured to or detached from the disks 90 in a minimum of time and with a minimum of effort. While for the purpose of illustration we have shown in Figure 16 the beater bars being mounted upon the disks 90 so that the rotor will have the opening at one end 180 degrees with respect to the opening at the other end and by the proper location of the long and short beater bars, it is, of course, apparent that the bars may extend the complete length of the rotor such as shown in Figure 6.

In order to enable the beater bars to have a different peripheral travel, as is clearly shown in Figure 5, this may be accomplished by interposing a washer 98 or a plurality of washers between the bar 93 and the flange 91 so that the leading or first bar in each group will be located at a greater distance from the shaft 60', thereby allowing more nuts to be admitted into the opening of the partial rotor as it passes the inlet of the machine. Since this operation has been heretofore described, it is not deemed necessary to elaborate further.

Instead of providing the bars 93 with holes adapted to register with the apertures 92 in the disks 90, these bars may be provided with laterally extending lugs, each lug having an aperture for being located in alinement with the apertures 92.

Figure 22:
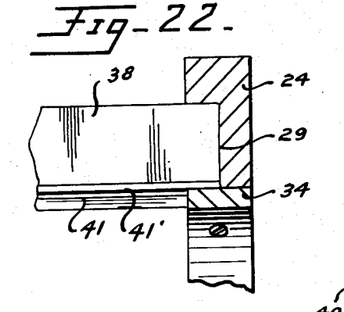
Figure 22 is a detail view, partly in section, showing the manner in which the end of the grate bar is mounted in its supporting segment.
Figure 23:
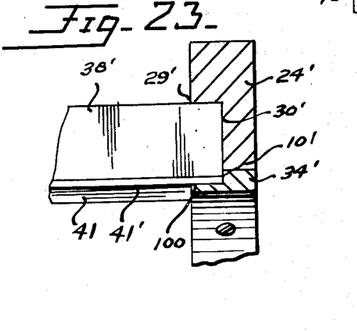
Figure 23 is a detail view, partly in section, illustrating the manner in which the bearing strip detachably connected to the supporting member for the grate bar is countersunk to enable the working face of the bar to be located closer to the outer periphery of the beater bars.
Figure 24:
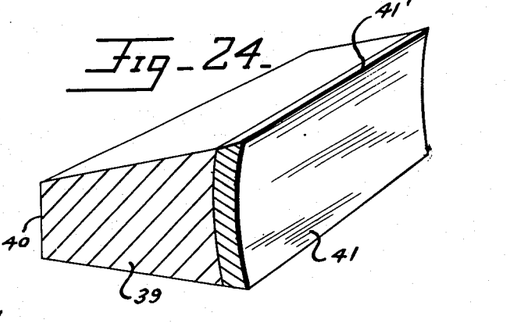
Figure 24 is a perspective view, partly in section, of the preferred form of grate bar.

In the event it is desired to have a smaller gap between the grate 16 and the rotor 17, such as with a run of small peanuts, this may be readily accomplished by mounting the grate bars as shown in Figure 23. To accomplish this end, the cutting or working edge 41' of the grate bar 28' must be located closer to the inner periphery of the annular supporting member 24', and for this purpose the bearing strip 34' is countersunk, as shown at 100, and vertical wall 101 of the countersunk portion is in alinement with base 30' of each recess 29' provided in the segments 25' and 26'. Referring to Figures 22 and 23, it will be noted that the recess 29' is of lesser height than the recess 29, but that the combined height of the recess 29' and the countersunk portion 100 is equal to that of the recess 29. This means that the same grate bar may be employed with either type of annular supporting member, and the advantage of this arrangement is believed to be fully apparent.

Figure 20:
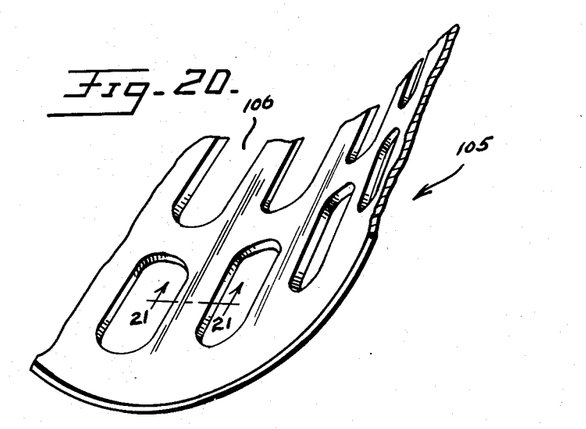
Figure 20 is a perspective view, partly broken away, of a modified grate which may be employed.
Figure 21:
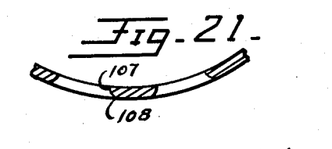
Figure 21 is a sectional view taken along the line 21—21 of Figure 20, looking in the direction of the arrows.

In Figures 20 and 21 we have shown a grate assembly 105 of the type more commonly referred to as a "basket." This grate assembly is made by punching or stamping a plurality of elongated apertures 106 in the body and the body is then bent to form a substantially circular grate and attached at its free ends to supporting rings. In forming the elongated apertures 106, the tool leaves a sharpened edge 107 and a rounded or approximately rounded edge 108. Heretofore, it has been customary to mount the assembly 105 in such a manner that the rounded edges 108 of the apertures would be at the inner periphery of the basket, since it was believed that peanuts could not be shelled by directing them against a sharp surface without having a deleterious effect on the peanuts. However, our experiments have shown the error of this theory and we mount the body on the supporting members with the cutting or sharpened edges 107 at the inner periphery whereby the hulls will be cut away as the nuts are fed out through the basket. This type of grate assembly may be inexpensively manufactured and the edges 107 will remain in a sharp condition for a considerable period of time.

In connection with the term "partial" used with the word cylinder or rotor, it is to be understood that this term has reference to a cylinder wherein certain of the beater bars are omitted from a section of the circumference of the rotor.

Figures 25, 26:
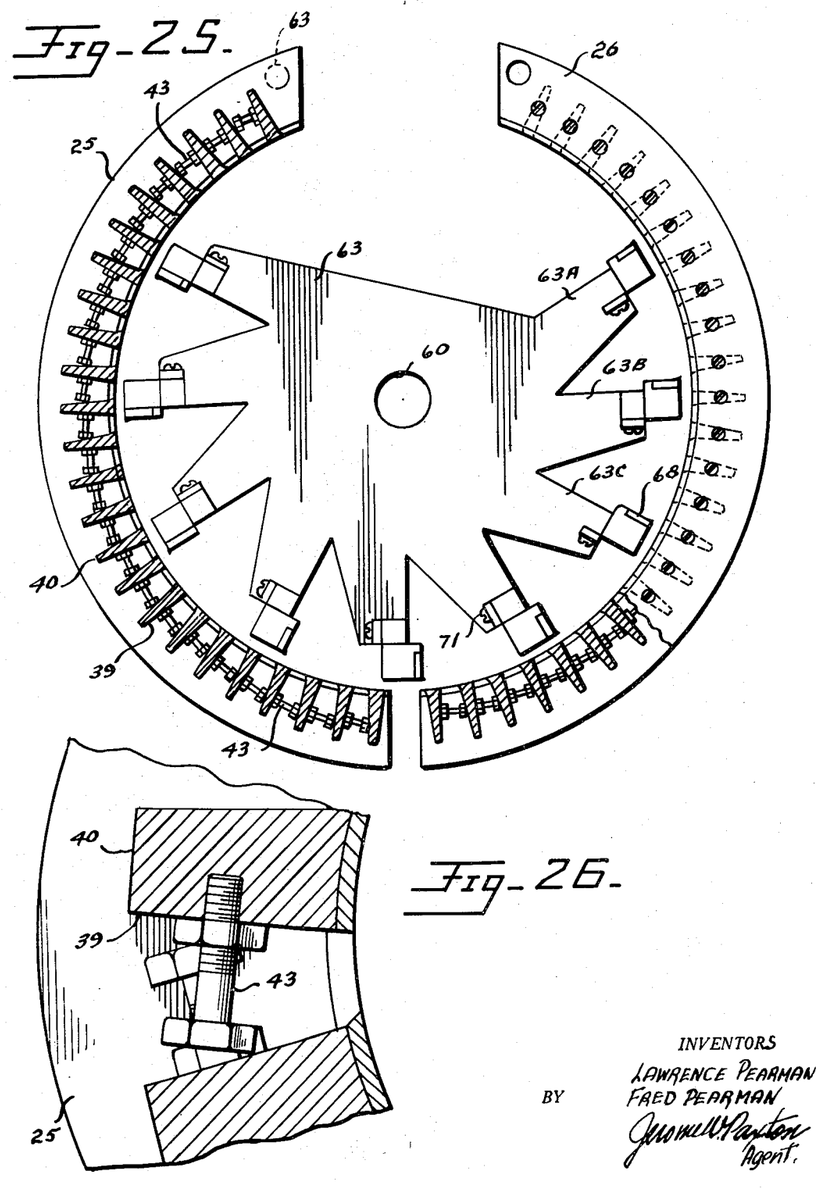
Figure 25 is a view in side elevation, partly in section, similar to Figure 5, but showing the beater bars carried by the rotor in such a manner that the bars have the same peripheral travel.
Figure 26 is a detail sectional view illustrating the manner in which the individual grate bars are held in proper position with respect to the annular members.

While in Figure 26 the aperture in which the bolt 43 is tapped does not extend completely through the bar, it is, of course apparent that this can be accomplished.

We claim:

1. A rotor construction disposed within and concentric to a shelling grate in a peanut shelling machine comprising a shaft journaled in the end walls of the machine, at least two spiders secured to the said shaft in spaced relation to each other, and a plurality of longitudinally-extending bars having a cutting working edge secured to said spiders for coacting with the shelling grate for shelling the nuts, said bars having a normal spacing about most of the perimeter of the rotor, and there being a greater spacing between two of the bars to provide an opening for the admission of peanuts into the rotor.

2. A rotor construction disposed within and concentric to a shelling grate in a peanut shelling machine comprising a shaft journaled in the end walls of the machine, at least two spiders secured to the said shaft in spaced relation to each other, a plurality of outwardly extending supporting arms on each of said spiders, a plurality of beater bars adapted to be attached to said supporting arms, and each of said beater bars having a hard abrasion-resisting cutting edge for cooperating with the shelling grate to shell the nuts, the said beater bars having a normal spacing about most of the perimeter of the rotor, and there being a greater spacing between two of the bars to provide an opening for the admission of peanuts into the rotor.

3. A rotor for use in nut shelling machines wherein the rotor is partially surrounded by a shelling grate and concentric to the shelling grate comprising a shaft journaled in the end walls of the shelling machine, spiders secured to the shaft in spaced relation, supporting arms extending outwardly from each of said spiders, beater bars attached to said supporting arms and being of such length as to extend substantially the entire length of the rotor, and detachable means to secure the bars to said supporting arms, the said beater bars having a normal spacing about most of the perimeter of the rotor, and there being a greater spacing between two of the bars to provide an opening for the admission of peanuts into the rotor.

4. A rotor for use in nut shelling machines wherein the rotor is partially surrounded by a shelling grate and concentric to the shelling grate comprising a shaft journaled in the end walls of the shelling machine, spiders secured to the shaft in spaced relation, supporting arms extending outwardly from each of said spiders, beater bars adapted to be attached to said supporting arms and being of such length as to extend substantially the entire length of the rotor, and complemental adjusting means carried by said bars and supporting arms, whereby the bars may be secured to said supporting arms at different distances from the shaft, the said beater bars having a normal spacing about most of the perimeter of the rotor, and there being a greater spacing between two of the bars to provide an opening for the admission of peanuts into the rotor.

5. A rotor for use in nut shelling machines wherein the rotor is partially surrounded by a shelling grate and concentric to the shelling grate comprising a shaft journaled in the end walls of the shelling machine, a spider having outwardly extending supporting arms secured to said shaft in proximity to each end of said shaft, an additional spider secured to said shaft intermediate the first named spiders and provided with outwardly extending supporting arms, beater bars adapted to be attached to alined supporting arms of each of said spiders and being of such length as to extend the entire length of the rotor, additional beater bars of lesser length than the first named beater bars attached to the supporting arms of one of the end spiders and of the intermediate spider, and further beater bars of the same length as the second named beater bars secured to the supporting arms of the intermediate spider and the other end spider at approximately 180 degrees with respect to said additional beater bars, said beater bars having a normal spacing about most of the perimeter of the rotor, and there being a greater spacing between two of the bars to provide an opening for the admission of the peanuts into the rotor.

6. A rotor construction as claimed in claim 5 wherein complemental adjusting means are provided for the said beater bars and the supporting arms on the said spiders for mounting the said bars at varying distances from the shaft.

7. In a rotor construction of the type disposed within and concentric to a shelling grate in a peanut shelling machine, a shaft journalled in the end walls of the machine, at least two supporting members secured to the shaft in spaced relationship with respect to each other, and a plurality of bars secured to said supporting members for coacting with the grate for shelling the nuts, said beater bars having a normal spacing about most of the perimeter of the rotor, and there being a greater spacing between two of the bars to provide an opening for the admission of the peanuts into the rotor.

8. In a rotor construction of the type disposed within and concentric to a shelling grate in a peanut shelling machine, a shaft journalled in the end walls of the machine, at least two supporting members secured to the shaft in spaced relationship with respect to each other, a flange on each of said supporting members, and a plurality of bars adapted to be secured to said flanges for coacting with the grate for shelling the nuts, the bars having a normal spacing about most of the perimeter of the rotor, and there being a greater spacing between two of the bars to provide an opening for the admission of the peanuts into the rotor.

LAWRENCE PEARMAN.
FRED PEARMAN.

References Cited in the file of this patent

UNITED STATES PATENTS

| Number | Name | Date |
| --- | --- | --- |
| Re. 4,245 | Hanna | Jan. 31, 1871 |
| 24,447 | Eames | June 21, 1859 |
| 1,022,342 | Theus | Apr. 2, 1912 |
| 1,286,007 | Howell | Nov. 26, 1918 |
| 1,308,384 | Williams | July 1, 1919 |
| 1,326,164 | Ammons | Dec. 30, 1919 |
| 1,359,766 | Stephen | Nov. 23, 1920 |
| 1,746,512 | Anderson | Feb. 11, 1930 |
| 2,302,227 | Kasser | Nov. 17, 1942 |
| 2,330,139 | Nickle et al. | Sept. 21, 1943 |
| 2,360,562 | Hall | Oct. 17, 1944 |
| 2,362,366 | Fowler | Nov. 7, 1944 |